United States Patent [19]

Frey

[11] Patent Number: 4,738,691

[45] Date of Patent: Apr. 19, 1988

[54] PROCESS FOR REMOVAL OF IMPURITIES FROM A GAS

[75] Inventor: Gerhard P. Frey, Starnberg, Fed. Rep. of Germany

[73] Assignee: Linde Aktiengesellschaft, Wiesbaden, Fed. Rep. of Germany

[21] Appl. No.: 1,140

[22] Filed: Jan. 7, 1987

Related U.S. Application Data

[63] Continuation-in-part of Ser. No. 917,459, Oct. 10, 1986, abandoned.

[30] Foreign Application Priority Data

Oct. 15, 1985 [DE] Fed. Rep. of Germany ....... 3536703
Mar. 19, 1986 [DE] Fed. Rep. of Germany ....... 3609292

[51] Int. Cl.$^4$ .................. B01D 53/14; B01D 53/22
[52] U.S. Cl. .................................. 55/23; 55/16; 55/48; 55/50; 55/51; 55/88; 62/54
[58] Field of Search .................. 55/16, 23, 48–51, 55/88; 62/17, 18, 36, 54, 58

[56] References Cited

U.S. PATENT DOCUMENTS

| | | | |
|---|---|---|---|
| 3,989,478 | 11/1976 | Jones | 55/23 X |
| 4,370,150 | 1/1983 | Fenstermaker | 55/16 |
| 4,386,944 | 6/1983 | Kimura | 55/16 |
| 4,392,871 | 7/1983 | Almlöf et al. | 55/23 |
| 4,475,928 | 10/1984 | Jacobson | 55/50 X |
| 4,479,811 | 10/1984 | Schlicht et al. | 55/48 X |
| 4,522,636 | 6/1985 | Markbreiter et al. | 55/23 |
| 4,545,787 | 10/1985 | Hegarty | 55/16 |
| 4,560,394 | 12/1985 | McDonald et al. | 55/16 |
| 4,591,365 | 5/1986 | Burr | 55/16 |
| 4,639,257 | 1/1987 | Duckett et al. | 55/16 |

FOREIGN PATENT DOCUMENTS

3348 1/1980 Japan ..................... 55/23

Primary Examiner—Robert Spitzer
Attorney, Agent, or Firm—Millen & White

[57] ABSTRACT

A process for removal of organic impurities from a gas mixture is disclosed for removing most of the impurities from the gas mixture in an economical way. The gas to be purified is subjected to two successive purification stages, in which the impurities still remaining in the gas to be purified after the first purification stage are burned in a second purification stage and the released energy thus is used for operating the first purification stage.

18 Claims, 2 Drawing Sheets

PROCESS FOR REMOVAL OF IMPURITIES FROM A GAS

This is a continuation-in-part of Ser. No. 917,459, filed Oct. 10, 1986, now abandoned.

BACKGROUND OF THE INVENTION

The invention relates to a process for the removal of organic impurities from a gas.

In the solvent industry and especially in transferring and loading of fuel into storage facilities, considerable amounts of solvent vapors or hydrocarbons are released into the environment with the exhaust air. It is known to reduce the emission of organic impurities by cooling the air-organic mixture in cold traps wherein the impurities are at least partially condensed. A process of this kind is described, for example, in U.S. Pat. Nos. 3,967,938 and 4,110,091. However, this known process has the disadvantage that even with the use of very low temperatures, not all impurities are condensed and removed from the gas to be purified, and therefore the impurities still continue to be released into the atmosphere. With the known process, government regulations with regard to permissible amounts of impurities discharged into the environment, as established, e.g., in the TA Luft, cannot be observed. A further disadvantage of the known process is the high energy consumption of the refrigeration units.

SUMMARY OF THE INVENTION

Therefore, an object of this invention is to provide a process for economical removal of impurities, such as hydrocarbons or vapors of organic liquids, from a gas mixture.

Another object of this invention is to provide a process for removal of organic impurities from a gas mixture with low energy consumption.

Another object of this invention is to provide a process for removal of organic impurities from a gas mixture wherein useful work is extracted from the gas mixture.

A further object of the invention is to provide a process which reduces the content of organic impurities in a gas mixture to a level which can be safely discharged into the environment.

Upon further study of the specification and appended claims, further objects and advantages of this invention will become apparent to those skilled in the art.

The objects according to the invention are attained by a process wherein the gas to be purified is subjected to two successive purification stages, in which the impurities still remaining in the gas to be purified after the first purification stage are burned in the second purification stage and the energy thereby released is used for operating the first purification stage.

Thus, a particular advantage of the invention is that the gas can be purified in successive purification stages in such a manner that the first purification stage operates without energy being fed from outside the system. Moreover, the two stage purification procedure according to this invention is very effective with respect to the degree of purification to be attained such that the gas to be purified is almost completely separated into liquefied impurities and purified gas. In the case of a gas mixture containing fuel vapors, a substantial portion of the entrained fuel can be recovered for subsequent use, while the exhaust air can be released with drastically reduced emission values.

In an advantageous embodiment of the invention the gas to be purified is cooled in a first purification stage to a temperature at which a substantial portion of the impurities condense. The condensate is then separated from the gas to be purified in a known manner. Preferably, energy is recovered in a secondary purification stage and used for operating a refrigeration unit, with which the gas to be purified is cooled in the first purification stage.

According to the invention the disadvantages of present processes are avoided by substantial removal of organic impurities from the gas. Thus, particularly the government regulations in force for environmental protection with respect to discharge of impurities into the atmosphere can be observed. An additional advantage of the process according to the invention is the extremely economical use of the energy produced in the second purification stage for operating of the first purification stage.

According to a preferred variant of the invention the energy released in the burning of the impurities is used for operating a conventional absorption refrigeration unit. Thus, for example, the coolant circulated in such an absorption refrigeration unit can be desorbed from a mixture of coolant and absorption liquid, by utilizing the thermal energy produced in the second purification stage, i.e., in the same manner as a gas refrigerator or air conditioner.

Advantageously, in another modification of the invention the gas to be purified is compressed in the first purification stage wherein a part of the impurities are condensed and separated from the gas. The energy required for compressing the gas to be purified, as already stated, is taken from the second purification stage, in which the energy extracted from the gas mixture is converted into mechanical energy by the interposition of a heat engine.

Preferably, the thermal energy released in the second purification stage by combustion is converted into mechanical energy in a heat engine which is then used to operate the first purification stage. Thus, for example, the heat engine can be a gas motor or a gas turbine driven by burning the residual impurities of the gas to be purified. Such a gas motor or gas turbine can be used to operate the compressor of a refrigeration unit.

It is also possible according to the invention to use the recovered energy in another way outside the purification system, if it would be disadvantageous to reuse this released energy in the system. In this case, the recovered energy can be converted, e.g., to produce electrical energy.

In another modification of the invention the condensation of the first purification stage is performed in several pressure and cooling cascading stages, in which the condensate of one pressure and cooling stage can be used as coolant in another pressure and cooling stage. This cascade technique is otherwise conventional.

According to another variant of the invention the gas to be purified can be subjected in a first purification stage to a physical scrubbing with polyethylene glycol ether as scrubbing agent. The thermal energy extracted during the second purification stage is used to strip the polyethylene glycol ether scrubbing agent to remove the impurities from the loaded scrubbing agent.

In another modification of the invention the gas to be purified is fed into the first purification stage through a semipermeable membrane whereby a portion of the impurities is separated from the gas to be purified. The pressure necessary for operating the semipermeable membrane is produced by a compressor, which again advantageously is operated by the energy released in the second purification stage. The mechanical energy necessary for this purpose is obtained from the second purification stage by interposition of a heat engine e.g., a rotating gas engine or a reciprocating gas motor. An advantage of this embodiment is a lower apparatus expenditure. For example, in gasoline loading or unloading facilities the content of gasoline is in the range of 0.3 to 1.3 kg hydrocarbons per $m^3$ air. After purification of this air-hydrocarbon mixture, for instance in a cooling trap at $-70°$ C., the mixture still contains approximately 0.1 kg hydrocarbons per $m^3$ air, which mainly consist of butane. To operate a combustion engine with butane approximately 18 $m^3$ air have to be mixed with 1 $m^3$ butane. By choosing a suitable temperature in the cooling trap a mixture with ideal combustion composition can be produced. Conditions for a gas turbine are similar. The hydrocarbon concentration in the exhaust gas of a combustion engine is very low and normally less than 50 ppm and as well in no case polluting the environment.

According to a preferred configuration of the invention the first purification stage is operated so that the amount of impurities remaining in the gas after the first purification stage is sufficient to produce enough energy in the second purification stage to operate the first purification stage. According to the invention this process offers the economic advantage of operating the first purification stage completely without the need of energy being fed from outside the system.

The process according to the invention has an advantageous application in the recovery of gasolines during loading or transferring of fuels. The air-hydrocarbon mixture produced in the fuel tanks generally contain about 20 to 40, more usually 25 to 35% by weight hydrocarbon with the remainder being air. These mixtures can be separated into gasoline and air, purified according to present government regulations, by the purification stages according to the invention. In general the composition of the mixture leaving the first stage is maintained at about 4 to 5 wt %, preferably 4.2 to 4.8 wt. % hydrocarbon, with the remainder being air. These mixtures are then burned. This process thus provides an extremely economical procedure for recovering costly fuel from the air-fuel mixture formed during the transferring or loading of gasolines. Moreover the process can be used for the recovery of any other hydrocarbons from solvents used for, e.g., the extraction of coconut oil or the production of detergents or from solvents used in other chemical or pharmaceutical processes.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
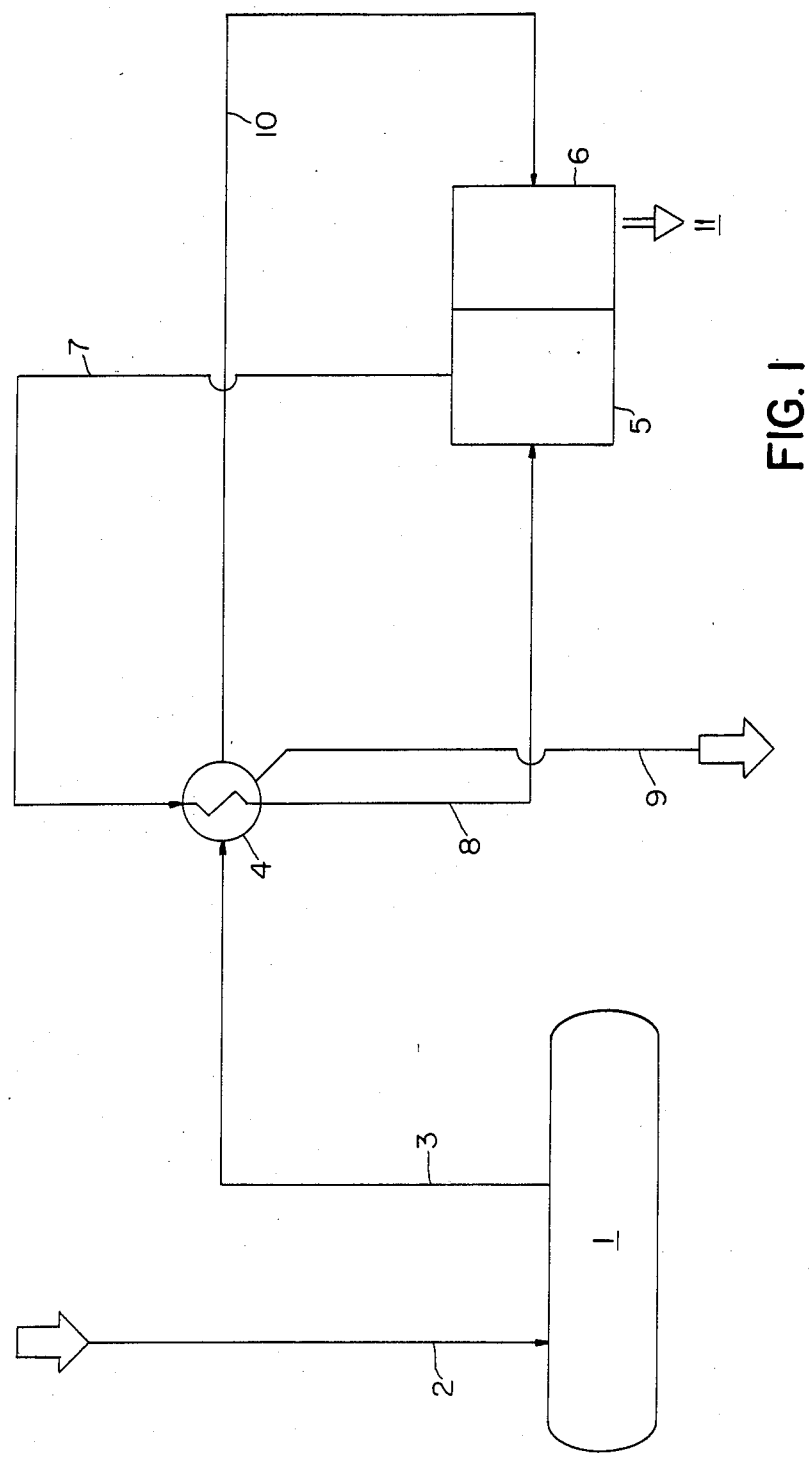
FIG. 1 illustrates an absorption refrigeration unit, connected to a combustion stage.

FIG. 1 illustrates a tank 1, to which liquid hydrocarbons are fed by a pipe 2. During delivery of the liquid hydrocarbons to tank 1 a portion of the hydrocarbons is converted into a gas phase which mixes with the air in the tank. The resultant air-hydrocarbon mixture is not released into the atmosphere, but instead is fed by a pipe 3 to a unit 4, the first purification stage, in which most of the hydrocarbons are separated from the air-hydrocarbon mixture.

Unit 4 in this embodiment is represented as a heat exchanger, in which the air-hydrocarbon mixture is cooled to, for example, $-50°$ C. Refrigeration unit 5, for example an absorption refrigeration unit having a circulating coolant, is provided for producing the cold temperatures needed for operating unit 4. The cold circulating agent is fed from refrigeration unit 5 to unit 4 by pipe 7. The air-hydrocarbon mixture is cooled in unit 4 by heat exchange with the circulating agent and a portion of the hydrocarbons are condensed out. Condensed hydrocarbons are removed from unit 4 by a pipe 9. The heated circulating agent is carried by a pipe 8 back to refrigeration unit 5 for cooling.

However, after cooling of the gas to be purified as well as condensation and separation of the hydrocarbons in unit 4, residual amounts of hydrocarbon are still present in the exiting air. According to the invention, this air-hydrocarbon mixture is not released into the atmosphere but instead is fed by pipe 10 to a second purification stage and subjected to a further treatment for removal of the remaining hydrocarbons.

In the embodiment of the invention shown, the air containing residual hydrocarbons is burned in a burner in a second purification stage 6. The exhaust air originating from the burner of second purification stage 6 is released by a pipe 11 into the environment, wherein the emission values are below the legally prescribed values. The thermal energy released during combustion in stage 6 is used to operate the refrigeration unit 5.

Figure 2:
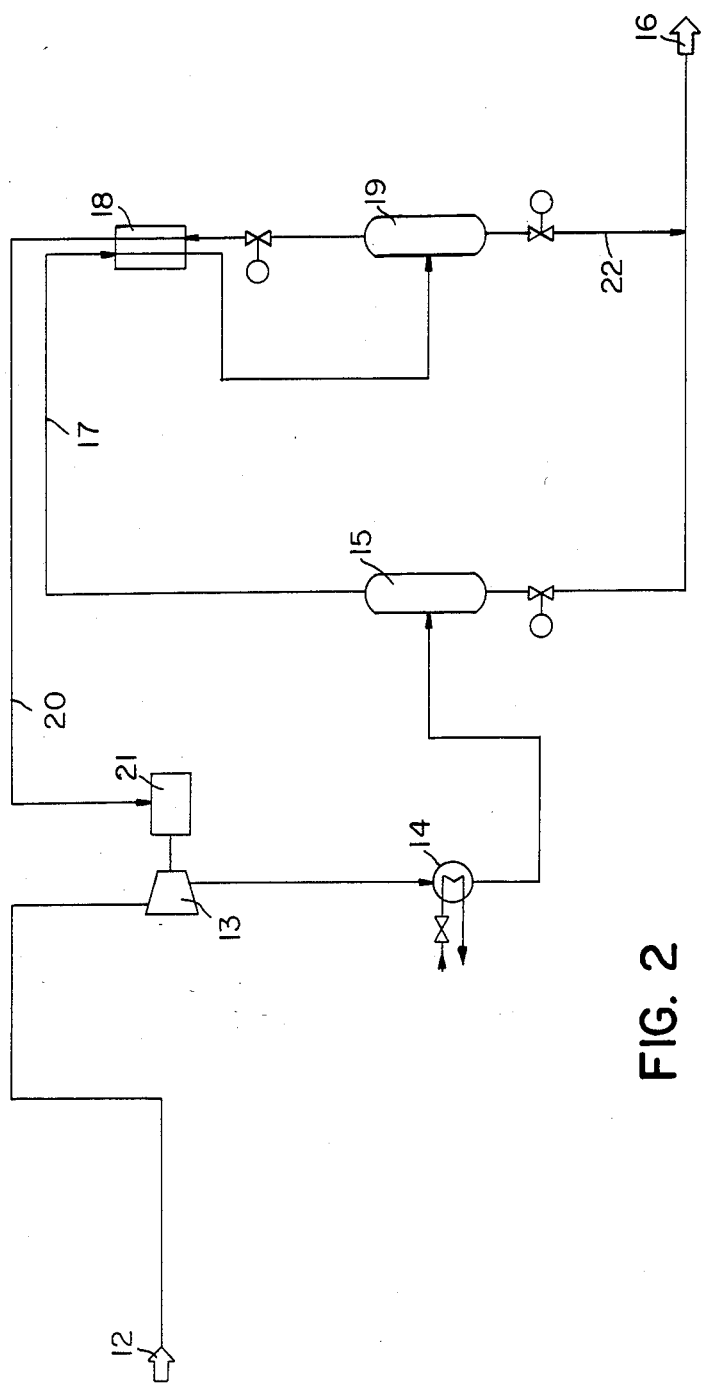
FIG. 2 illustrates a compression and separation stage, connected to a gas turbine.

An embodiment of the invention for gasoline recovery is represented in detail in FIG. 2. The gasoline-air mixture to be separated is fed by a pipe 12 to a compression unit 13. Under pressure of, for example, 6 bar and after cooling in a heat exchanger 14, most of the gasoline is condensed out and separated from the gasoline-air mixture in a separator 15. The recovered gasoline is fed by a pipe 16 to a gasoline storage tank. The remaining residual gasoline-air mixture is sent via pipe 17 to a cold trap 18 with subsequent separation in another separator 19. Thus the air mixed with gasoline is purified by plural stages and at the same time expensive gasoline is recovered.

According to the embodiment shown, the remaining gasoline-air mixture is fed by pipe 20 to a heat engine 21, in this particular case a gas turbine. By burning the gasoline-air mixture in a gas turbine 21 the recovered combustion heat is converted directly into mechanical energy. Compressor 13 of the compression unit can be driven with the mechanical energy extracted by gas turbine 21. The separated gasoline is fed from separator 19 to a gasoline storage tank by a pipe 21.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight, unless otherwise indicated.

Alternatively to the embodiment illustrated in FIG. 2, heat exchanger 14 can be replaced by an unit having a semipermeable membrane wherein flow of the gas mixture from compressor 13 is forced through the semipermeable membrane whereby a portion of the impurities are removed and separated from the gas mixture. In another alternative, the heat exchanger 4 and refrigeration unit 5 of FIG. 1 can be replaced by a scrubbing column and a stripping unit, respectively, wherein the circulated scrubbing agent is polyethylene glycol ether and the loaded scrubbing agent is stripped by the use of thermal energy obtained in burner 6.

Example referring to FIG. 2:

For instance FIG. 2 represents a vapor recovery in a medium size refinery with gasoline loading and unloading facilities.

Feedstream 1: 1500 Nm$^3$/h with about
0.9 kg hydrocarbons per Nm$^3$
pressure after the compressor 13: 6 bar abs.
temperature in the separator 15: +7° C.
temperature in refrigeration 19: −10° C.
vapor recovery rate: 94%=1269 kg/h.

The power consumption of the compressor is about 150 kW, the available energy for the gas turbine 21 is about 950 kW. With an efficiency of the gas turbine of about 20% the energy system will be balanced.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for removal of organic impurities from a gas mixture, comprising subjecting the gas mixture to successive purification stages, wherein said organic impurities are removed in liquid form from the gaseous mixture in a first purification stage and residual organic impurities remaining in the gas mixture after said first purification stage are combusted in a second purification stage and the thermal energy released during combustion is used for operating the first purification stage.

2. A process according to claim 1, wherein the gas mixture is cooled in said first purification stage to condense a portion of the impurities and the condensed impurities are then separated from the gas mixture.

3. A process according to claim 2, wherein the gas mixture is cooled in said first purification stage by a refrigeration unit, said refrigeration unit operating by energy released in the second purification stage.

4. A process according to claim 3, wherein the first purification stage is operated so that the amount of impurities remaining in the gas mixture after the first purification stage is sufficient to generate enough energy in the second purification stage to operate the first purification stage.

5. A process according to claim 3, wherein the gas mixture comprises air and gasoline vapors.

6. A process according to claim 2, wherein the gaseous mixture is cooled in said first purification stage by an absorption refrigeration unit and the thermal energy produced in said second purification stage is used to operate said absorption refrigeration unit.

7. A process according to claim 1, wherein the gas mixture is compressed in the first purification stage thereby condensing and separating a portion of the impurities from the gas mixture, and energy necessary for compression being obtained from a heat engine driven by energy released in the second purification stage.

8. A process according to claim 7, wherein said first purification stage further comprises several pressure and cooling steps.

9. A process according to claim 7, wherein the first purification stage is operated so that the amount of impurities remaining in the gas mixture after the first purification stage is sufficient to generate enough energy in the second purification stage to operate the first purification stage.

10. A process according to claim 7, wherein the gas mixture comprises air and gasoline vapors.

11. A process according to claim 1, wherein the gas mixture is subjected to a physical scrubbing with polyethylene glycol ether as scrubbing agent in said first purification stage to remove a portion of the impurities from the gas mixture by absorption.

12. A process according to claim 11, wherein the first purification stage is operated so that the amount of impurities remaining in the gas mixture after the first purification stage is sufficient to generate enough energy in the second purification stage to operate the first purification stage.

13. A process according to claim 11, wherein the gas mixture comprises air and gasoline vapors.

14. A process according to claim 11, wherein said thermal energy produced in said second purification stage is used to strip said scrubbing agent to remove said inorganic impurities from said scrubbing agent.

15. A process according to claim 1, wherein the first purification stage is operated so that the amount of impurities remaining in the gas mixture after the first purification stage is sufficient to generate enough energy in the second purification stage to operate the first purification stage.

16. A process according to claim 1, wherein the gas mixture comprises air and gasoline vapors.

17. A process according to claim 1, wherein the thermal energy released during combustion in said second purification stage is converted into mechanical energy which is then used to operate said first purification stage.

18. A process according to claim 1, wherein said gaseous mixture is an air-hydrocarbon mixture, formed during the loading or transferring of fuels, which contains about 20–40% by weight hydrocarbons and the residual amount of hydrocarbons remaining in the gaseous mixture after the first purification stage is about 4–5% by weight.

* * * * *